Patented Oct. 5, 1948

2,450,777

UNITED STATES PATENT OFFICE 2,450,777

SULFAMYL-2-MERCAPTOBENZOTHIAZOLES

Charles F. H. Allen, Rochester, N. Y., and Alan Bell, Knoxville, Tenn., assignors to Eastman Kodak Company, Rochester, N. Y., a corporation of New Jersey No Drawing. Application April 20, 1944, Serial No. 531,979

1 Claim. (Cl. 260—306)

This invention relates to sulfamyl-2-mercaptobenzothiazoles. We have prepared such compounds, examples of which we describe below, together with methods of preparation of these compounds and their intermediates.

*Example 1.*—Preparation of intermediate compound N-(4'- chlorophenyl) - 3 - nitro-4-chlorobenzenesulfonamide.

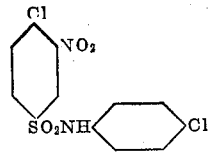

A mixture of 10 parts each of 3-nitro-4-chlorobenzenesulfonyl chloride (P. Fischer, Ber. 24, 3190 (1891)) and p-chloroaniline, and 50 parts of acetone was heated for 2 hours on the steam bath. The solvent was distilled and the residue washed with dilute hydrochloric acid. The product, 9 parts, was crystallized from benzene; M. P. 120–121° C. (Calcd. for $C_{12}H_8O_4N_2SCl_2$: Cl, 20.46. Found: Cl, 20.37.)

*Example 2.*—2-mercapto - 4'- chloro-5-phenylsulfamyl benzothiazole,

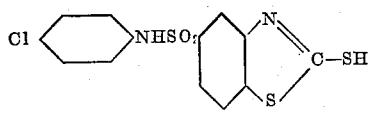

To a hot solution of 5.8 parts of sodium sulfide, 4.8 parts of flowers of sulfur and 28 parts of water, were added 8.5 parts of N-(4'-chlorophenyl) - 3 - nitro - 4 - chlorobenzenesulfonamide and 5 parts of carbon disulfide, and the mixture was heated on the steam bath for 3 hours; it was then filtered, and the filtrate was cooled to 20° and acidified with dilute (1:1) hydrochloric acid. The product which precipitated was dissolved in sodium hydroxide, reprecipitated by acid, filtered, washed and dried. It melted at 208–210° with decomposition. The yield was 5.5 parts. (Analysis: Calcd. for $C_{13}H_9O_2N_2S_3Cl$: S, 26.9. Found: S, 25.1. Sulfur analyses tend to give slightly low results, but are useful for showing how many sulfur atoms have been introduced into the molecule.)

*Example 3.*—Preparation of intermediate compound N-(4'-acetaminophenyl)-3-nitro-4-chlorobenzenesulfonamide,

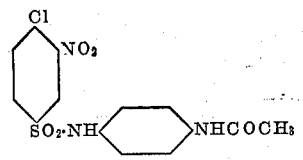

A mixture of 25.6 parts of 3-nitro-4-chlorobenzene sulfonyl chloride, 15 parts of p-aminoacetanilide, 10 parts of sodium acetate, and 100 parts of acetic acid was heated on the steam bath for 2 hours. The solid was precipitated by pouring upon ice; it was filtered, washed and dried. The yield was 27 parts, M. P. 188–190° C.

*Example 4.*—2 - mercapto - 4'- acetamino - 5-phenylsulfamylbenzothiazole.

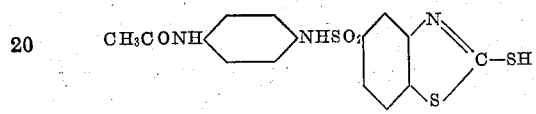

To a hot solution of sodium polysulfide, prepared from 18 parts of sodium sulfide, 15 parts of flowers of sulfur, and 85 parts of water, were added 15 parts of carbon disulfide and 25 parts of N-(4'- acetaminophenyl) - 3 - nitro-4-chlorobenzenesulfonamide, and the mixture was heated for 3 hours on the steam bath. It was then filtered, and the cold filtrate acidified with hydrochloric acid. The product was dissolved in alcohol, treated with decolorizing carbon, filtered, and allowed to crystallize from the alcohol. It formed yellow crystals in a yield of 10 parts, M. P. 284–285° C. (Analysis: Calcd. for $C_{15}H_{13}O_3N_3S_3$: S, 28.48. Found: S, 27.8.)

*Example 5.*—2-mercapto-4'-amino-5-phenylsulfamyl benzothiazole,

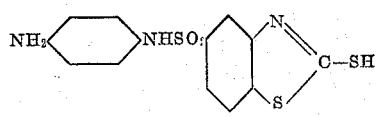

A mixture of 12 parts of 2-mercapto-4'-acetamino-5-phenylsulfamyl benzothiazole, 24 parts of concentrated hydrochloric acid, and 100 parts of alcohol was heated on the steam bath for 2 hours; a clear solution resulted. It was diluted with water and made just basic (Congo red no longer changed color). The product was filtered, washed and dried. It was a white compound melting at 230–232° C. with decomposition.

*Example 6.*—Preparation of intermediate compound N-(2'-hydroxyphenyl)-3-nitro-4-chlorobenzenesulfonamide

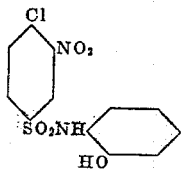

A mixture of 15.4 parts of o-aminophenol, 37.5 parts of 3-nitro-4-chlorobenzenesulfonyl chloride, 15 parts of sodium acetate and 75 parts of acetic acid was heated on the steam bath for ½ hour. The solid that separated on cooling was filtered, washed and dried. For purification it was taken up in ether and extracted successively with 3% hydrochloric acid, water, and 3% aqueous sodium carbonate solution. The extract was dried with calcium chloride, the ether was removed and the residue was crystallized from benzene. The yield was 16 parts, M. P. 143–145° C. (Analysis: Calcd. for $C_{12}H_9O_5N_2SCl$: N, 8.53. Found: N, 8.43.)

*Example 7.*—2 - mercapto - 2' - hydroxy-5-phenylsulphamyl benzothiazole,

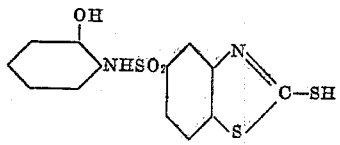

To a hot solution of sodium polysulfide, prepared as in Example 5 but using one-half of all the amounts, there were added 5 parts of carbon disulfide and 8.3 parts of N-(2'-hydroxyphenyl)-3-nitro-4-chlorobenzene sulfonamide, and the mixture was heated on the steam bath for 3 hours. It was then evaporated to dryness and extracted with sodium carbonate solution; the extract was cooled and acidified, and the product filtered and dried. It was purified by crystallization from dilute alcohol; the yield was 4.5 parts; M. P. 246–248° C., with decomposition. (Analysis: Calcd. for $C_{13}H_{10}O_3N_2S_3$: N, 8.24. Found: 8.30.)

*Example 8.*—Preparation of intermediate compound N - (2' - hydroxy-4'-methyl-phenyl)-3-nitro-4-chlorobenzenesulfonamide,

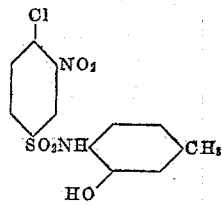

A mixture of 25.6 parts of 3-nitro-4-chlorobenzenesulfonyl chloride, 12.3 parts of 2-amino-5-methyl phenol, 10 parts of sodium acetate and 50 parts of acetic acid was heated on the steam bath for ½ hour. After cooling to room temperature, the solution was diluted with 25 parts of water and left to crystallize. The product was purified by dissolving in ether and extracting successively with 3% hydrochloric acid, water, and 3% aqueous sodium carbonate solution. After drying the extract with calcium chloride, the ether was removed and the residue crystallized from benzene. The yield was 14.5 parts, M. P. 155–156° C. (Analysis: Calcd. for $C_{13}H_{11}O_5N_2SCl$: N, 8.18. Found: N, 8.04.)

*Example 9.*—2 - mercapto - 2' - hydroxy-4'-methyl-5-phenylsulfamyl benzothiazole,

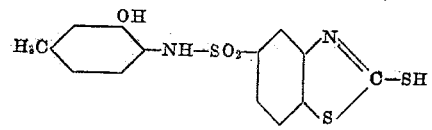

To a hot solution of sodium polysulfide, prepared from 10 parts of sodium sulfide, 8 parts of flowers of sulfur, and 50 parts of water, were added 10 parts of N-(2'-hydroxy-4'-methyl-phenyl)-3-nitro-4-chlorobenzenesulfonamide and 5 parts of carbon bisulfide, and the mixture was heated on the steam bath for 3 hours. It was then evaporated to dryness and extracted with sodium carbonate solution; the extract was cooled and acidified, and the product filtered and dried. It was purified by crystallization from dilute alcohol; the yield was 6.5 parts, M. P. 218–220°, with decomposition.

While we have given certain illustrative examples, it will be obvious that other substituents than those shown may be present on the benzene ring attached to the nitrogen atom of the sulfamyl group, and that their number and positions may vary.

What we claim as our invention and desire to be secured by Letters Patent of the United States is:

A 5-arylsulfamyl- 2 -mercapto-benzothiazole, having the structural formula

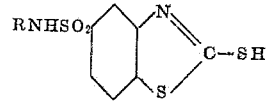

in which R is a substituted phenyl group selected from the class consisting of 4-chlorophenyl, 4-acetaminophenyl, 4-aminophenyl, 2-hydroxyphenyl, and 2-hydroxy-4-methylphenyl.

CHARLES F. H. ALLEN.
ALAN BELL.

REFERENCES CITED

The following references are of record in the file of this patent:

UNITED STATES PATENTS

| Number | Name | Date |
|---|---|---|
| 2,271,238 | Vittum et al. | Jan. 27, 1942 |
| 2,296,306 | Peterson | Sept. 22, 1942 |
| 2,298,443 | Weissberger | Oct. 13, 1942 |
| 2,318,556 | Hentrich et al. | May 4, 1943 |

FOREIGN PATENTS

| Number | Country | Date |
|---|---|---|
| 782,126 | France | Mar. 11, 1935 |

OTHER REFERENCES

Chem. Abst., vol. 21, p. 2688, citing: Journal Amer. Chem. Soc., vol. 49, pp. 1748–1758.